United States Patent
Fushimi et al.

(10) Patent No.: US 11,790,436 B2
(45) Date of Patent: Oct. 17, 2023

(54) CONTENT MANAGEMENT APPARATUS, CONTENT MANAGEMENT METHOD, AND PROGRAM

(71) Applicant: FUTURE SHOP CO., LTD., Osaka (JP)

(72) Inventors: Yuko Fushimi, Osaka (JP); Yoshikazu Sueda, Osaka (JP); Takayuki Yasuhara, Osaka (JP); Satoshi Sakaue, Osaka (JP); Tetsuya Kawauchi, Osaka (JP); Mamoru Nagasue, Osaka (JP); Shuhei Takahashi, Osaka (JP)

(*) Notice: Subject to any disclaimer, the term of this patent is extended or adjusted under 35 U.S.C. 154(b) by 0 days.

(21) Appl. No.: 17/056,898

(22) PCT Filed: Apr. 11, 2019

(86) PCT No.: PCT/JP2019/015867
§ 371 (c)(1),
(2) Date: Nov. 19, 2020

(87) PCT Pub. No.: WO2019/225200
PCT Pub. Date: Nov. 28, 2019

(65) Prior Publication Data
US 2021/0209674 A1    Jul. 8, 2021

(30) Foreign Application Priority Data
May 21, 2018 (JP) ................. 2018-097478

(51) Int. Cl.
*G06Q 30/0601* (2023.01)
*G06Q 30/0241* (2023.01)

(52) U.S. Cl.
CPC ..... *G06Q 30/0641* (2013.01); *G06Q 30/0277* (2013.01); *G06Q 30/0603* (2013.01)

(58) Field of Classification Search
CPC .......... G06Q 30/02-0277; G06F 13/00; G06F 3/048; G06F 9/44
See application file for complete search history.

(56) References Cited

U.S. PATENT DOCUMENTS

2005/0246627 A1   11/2005   Sayed
2006/0031147 A1   2/2006    Bell et al.
(Continued)

FOREIGN PATENT DOCUMENTS

JP   2003122671 A    4/2003
JP   2004-021838 A   1/2004
(Continued)

OTHER PUBLICATIONS

The series editorial department which can do it, and made homepage builder 21 The first edition, Japan, Impress Corporation Tsuchida Yoneichi, Oct. 11, 2016, the 1st edition, the 23rd
(Continued)

*Primary Examiner* — Raquel Alvarez
(74) *Attorney, Agent, or Firm* — Masuvalley & Partners; Peter Martinez

(57) ABSTRACT

Content with a desired layout is created easily and safely. The content management apparatus (3) includes a storage unit (32) for storing a plurality of parts constituting a part of the content, and a control unit (33) for creating the content by combining the plurality of parts which are respectively arranged at desired positions and selected from the storage unit (32). Here, the parts include system parts which are essential for displaying the content and are restricted from being edited by a business operator which is a user, and a design part, that is, an optional part which is created by the business operator who is a user and can be added arbitrarily. Then, the control unit 33 rearranges the system parts which
(Continued)

are arranged at predetermined positions, and arranges the design part between the system parts to create the content.

7 Claims, 14 Drawing Sheets

(56) References Cited

U.S. PATENT DOCUMENTS

| | | |
|---|---|---|
| 2011/0264499 A1 | 10/2011 | Abendroth et al. |
| 2013/0066727 A1 | 3/2013 | Distefano, III |
| 2017/0185612 A1 | 6/2017 | Kamadolli et al. |
| 2022/0166731 A1* | 5/2022 | Rey .................... G06N 3/08 |

FOREIGN PATENT DOCUMENTS

| | | |
|---|---|---|
| JP | 2016151814 A | 8/2016 |
| JP | 2018-097478 A | 6/2018 |
| WO | 2009-028334 A1 | 3/2009 |
| WO | 2016-092626 A1 | 6/2016 |

OTHER PUBLICATIONS

WIPO, Japanese International Search Authority, International Search Report (with English translation) and Written Opinion dated May 14, 2019 in International Application No. PCT/JP2019/015867, 7 pages.

EPO, the extended European search report dated Feb. 7, 2022 for EP application No. 19807840.4, 7 pages.

EPO, Communication pursuant to Article 94(3) dated Dec. 23, 2022 for European Patent Application No. 19807840.4, 5 pages.

* cited by examiner

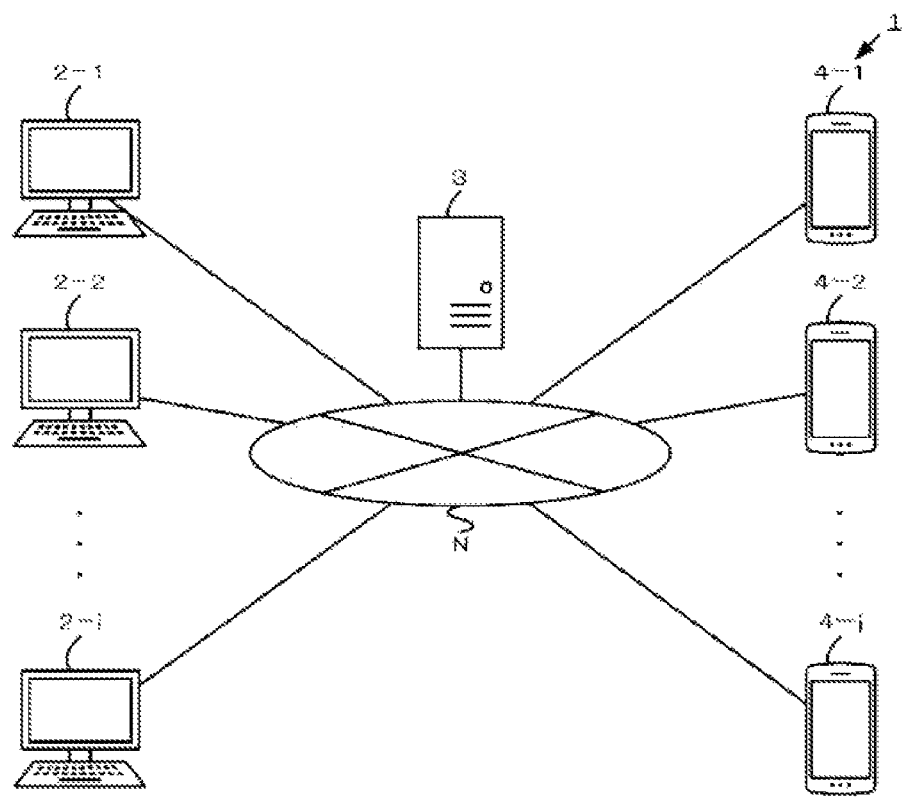
[FIG.1]

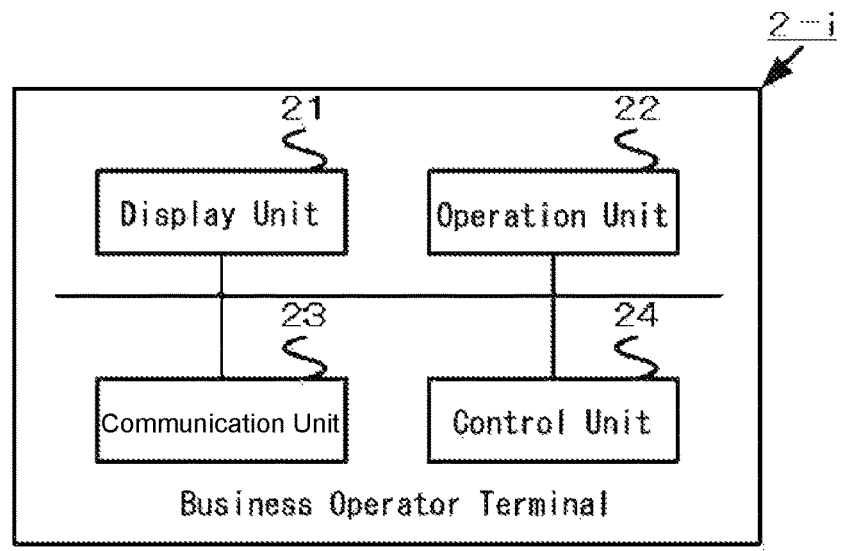
[FIG.2]
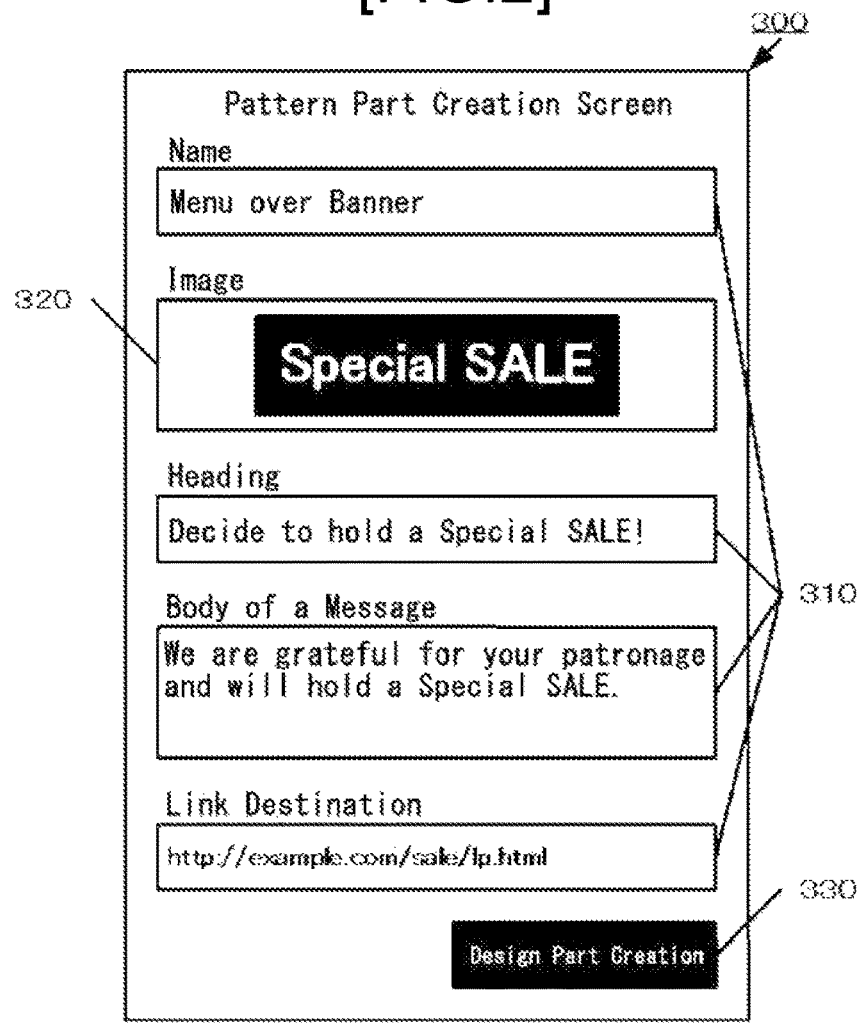
[FIG.3]

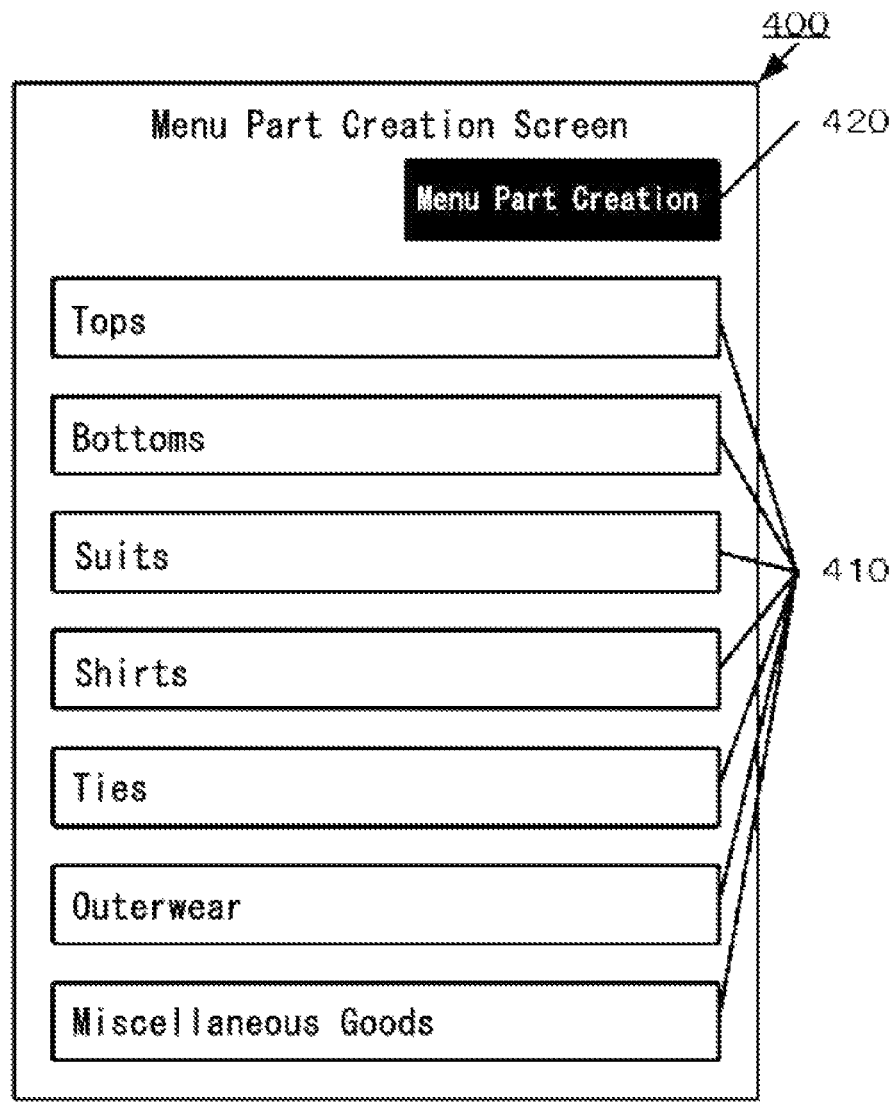
[FIG.4]

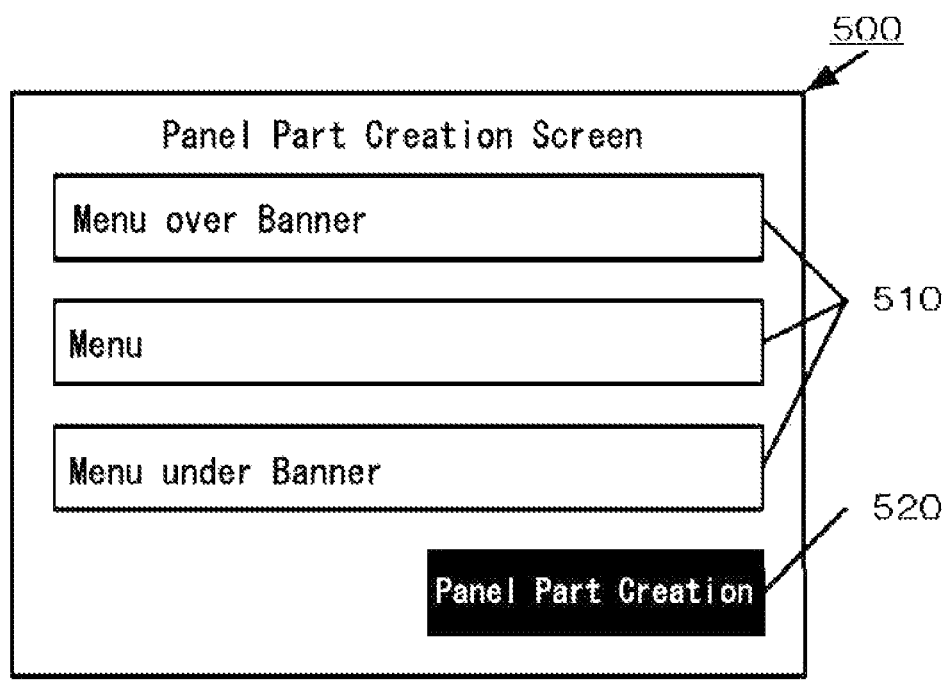
[FIG.5]

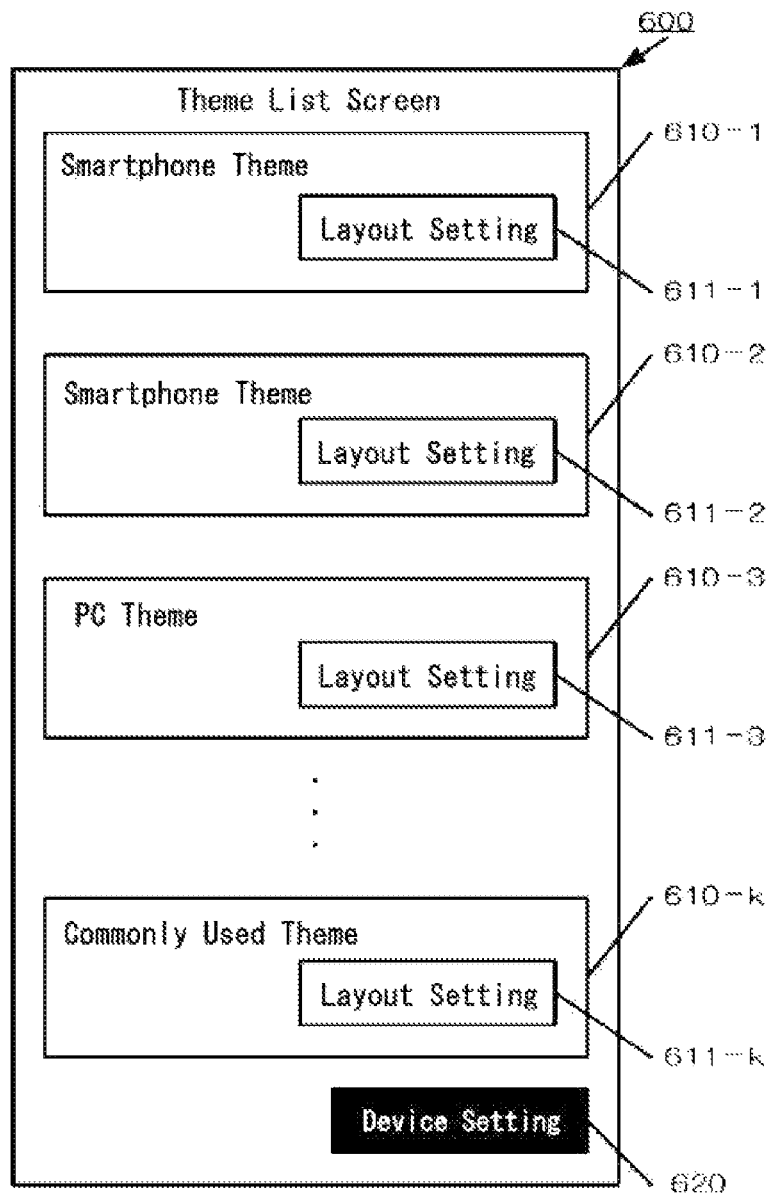
[FIG.6]

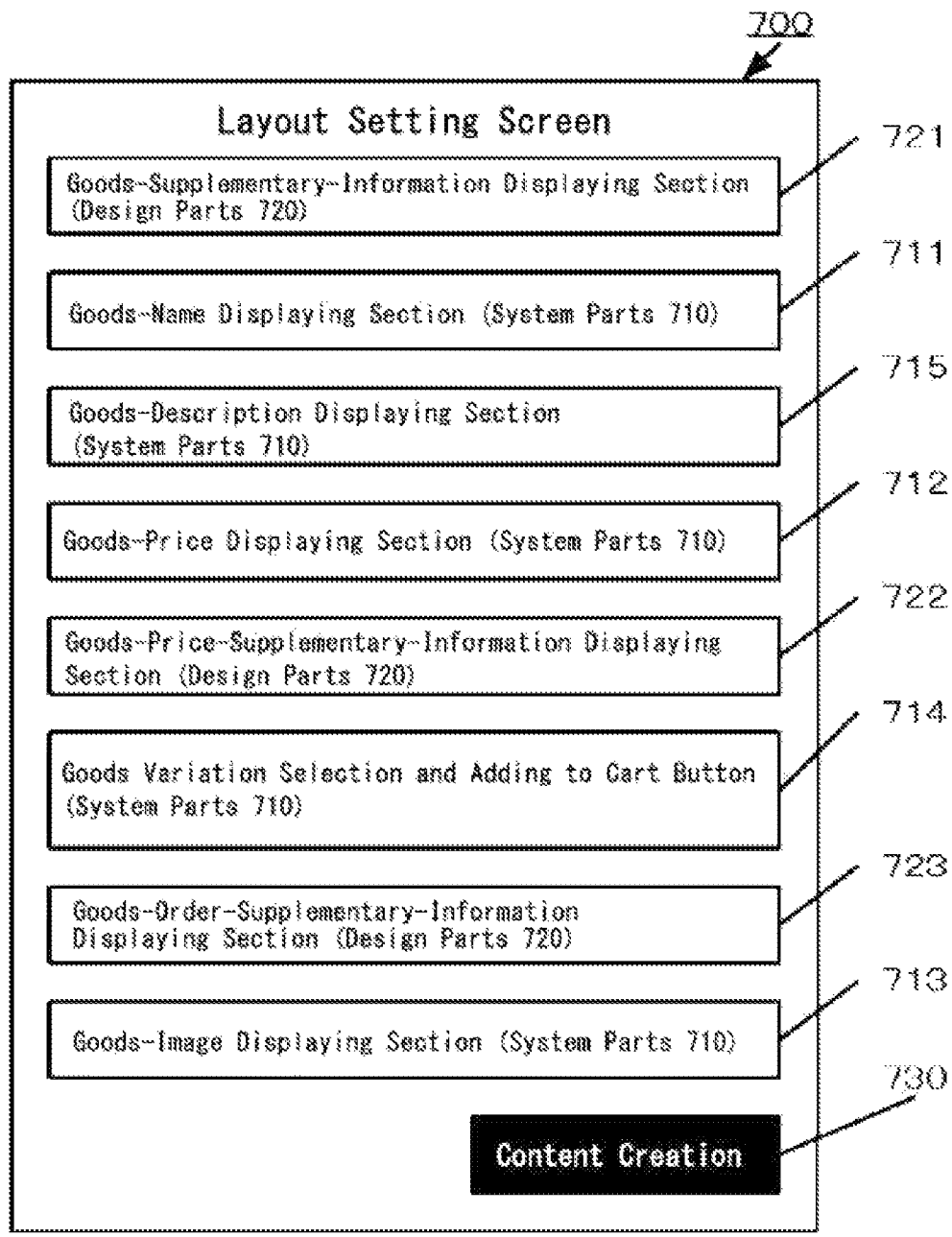
[FIG.7]

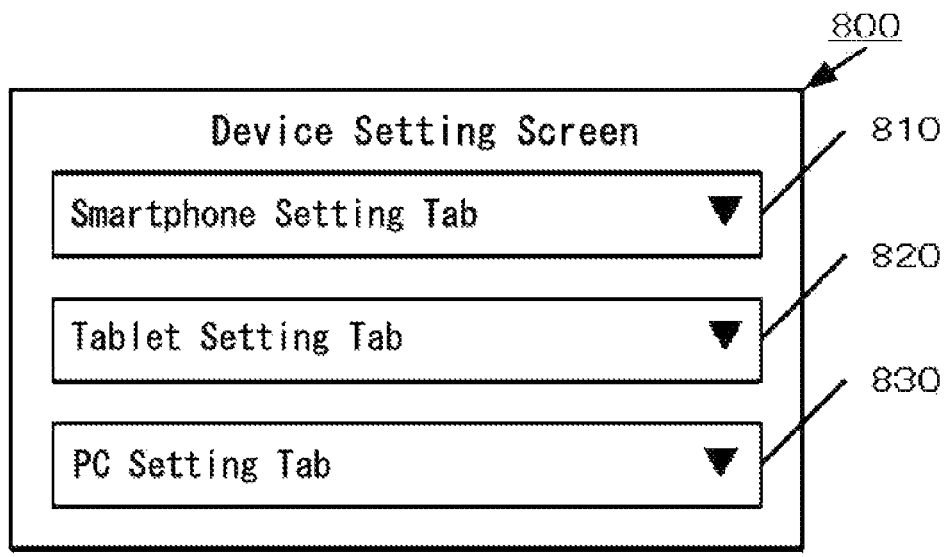
[FIG.8]
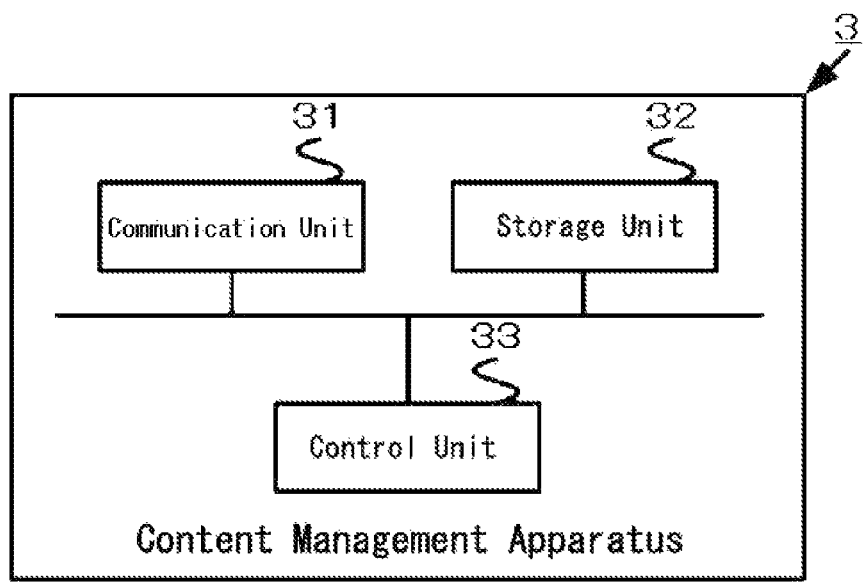
[FIG.9]

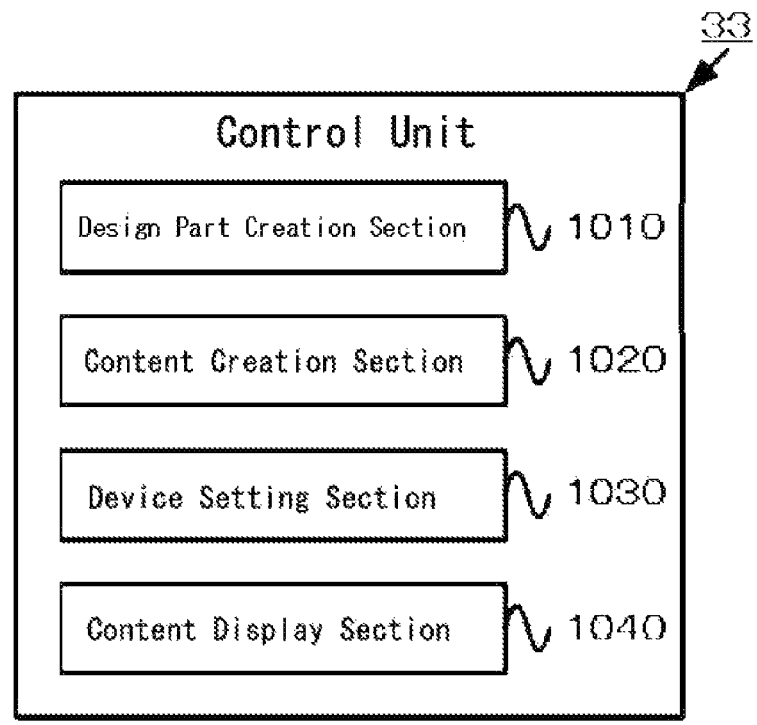
[FIG.10]
[FIG.11]

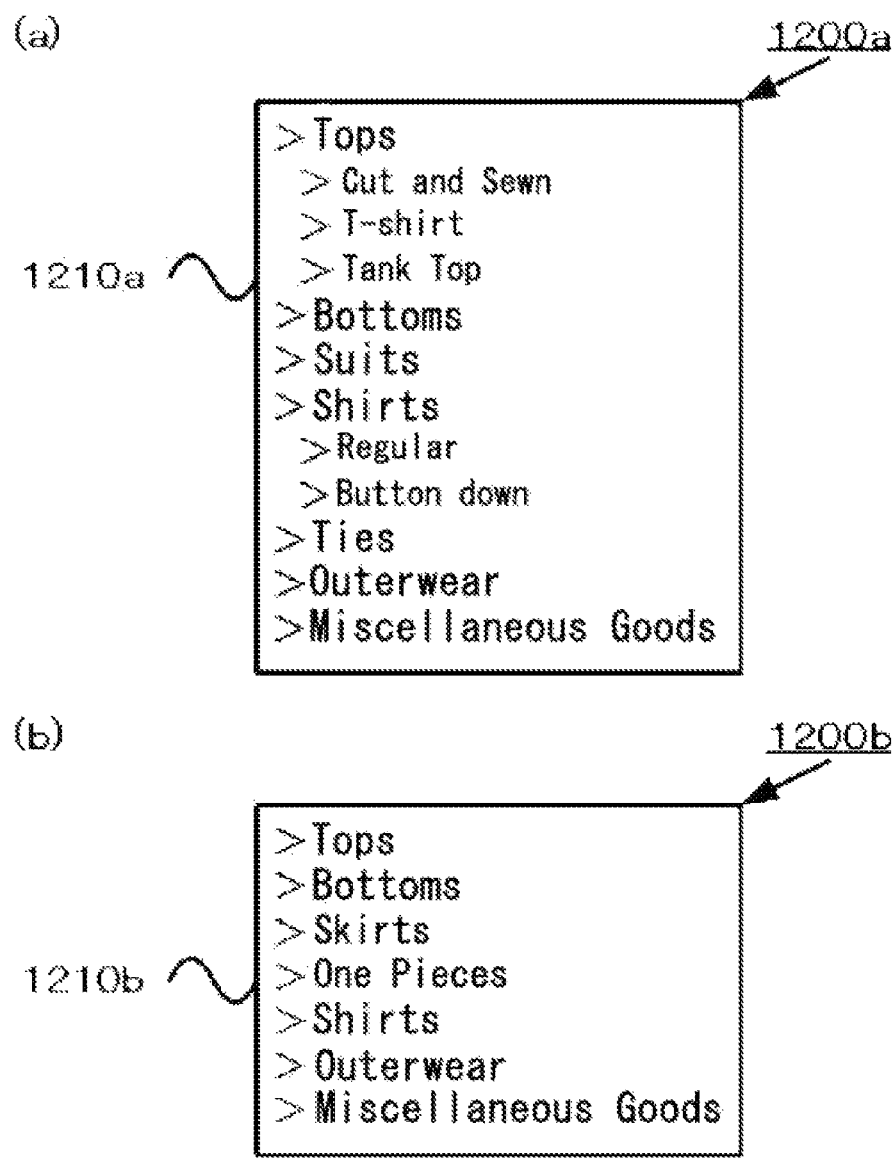
[FIG.12]

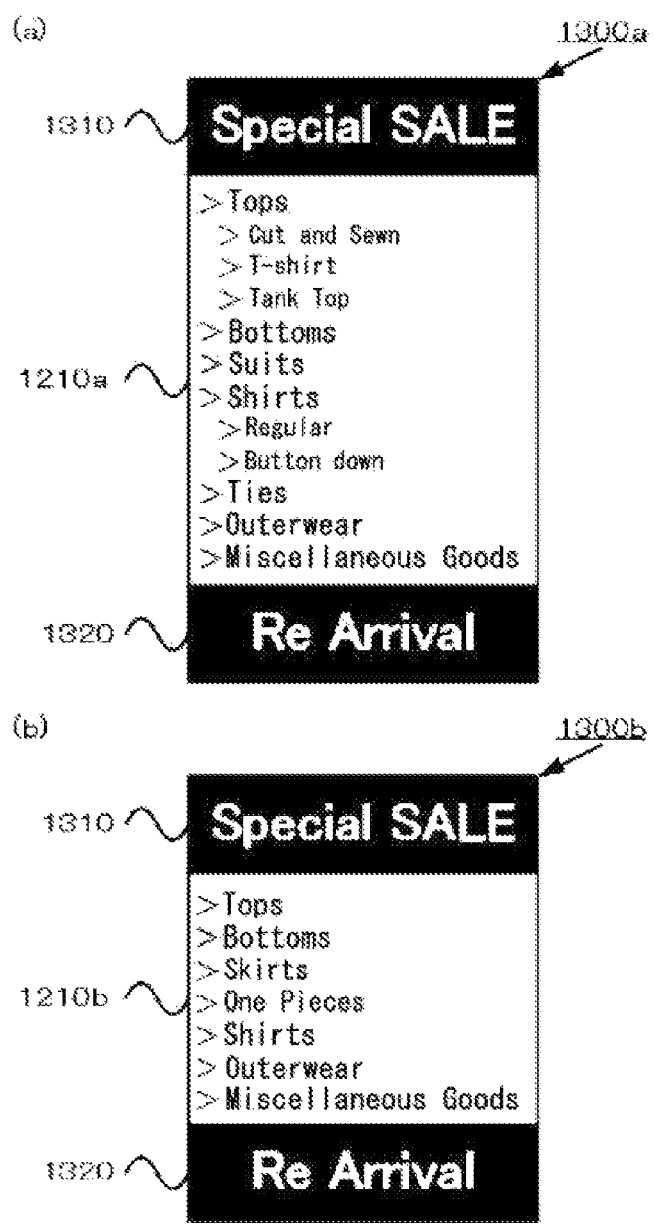
[FIG.13]

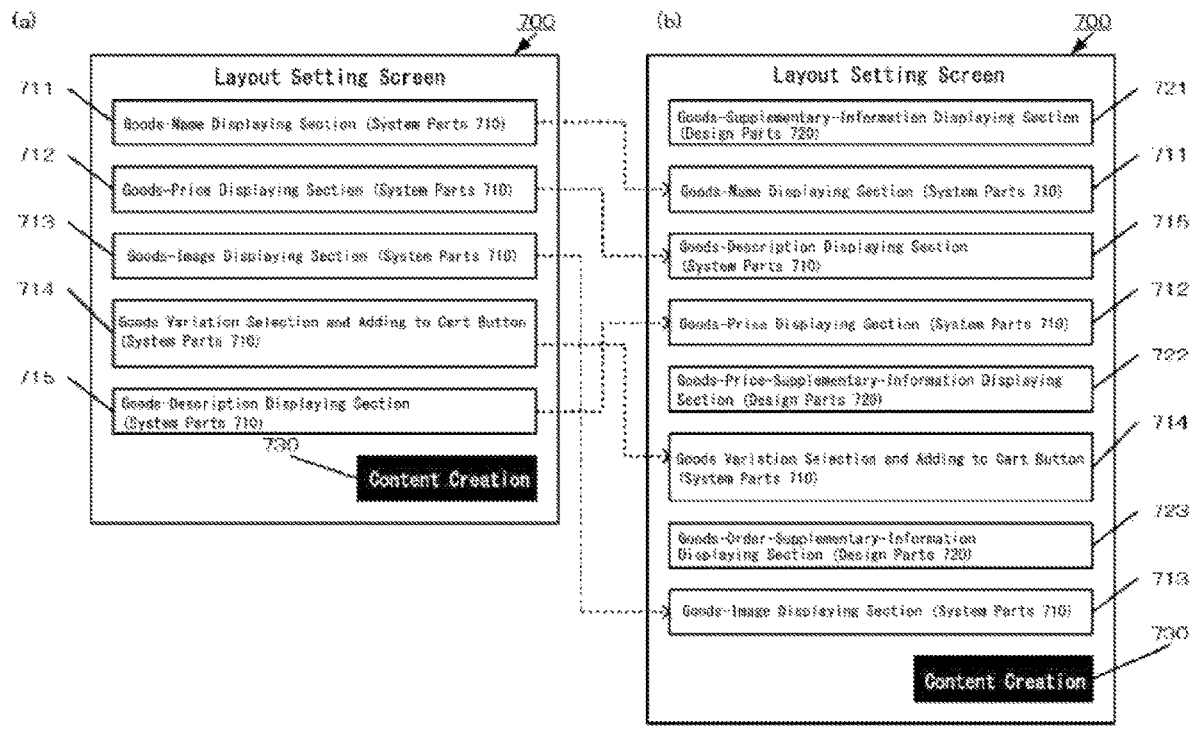
[FIG.14]
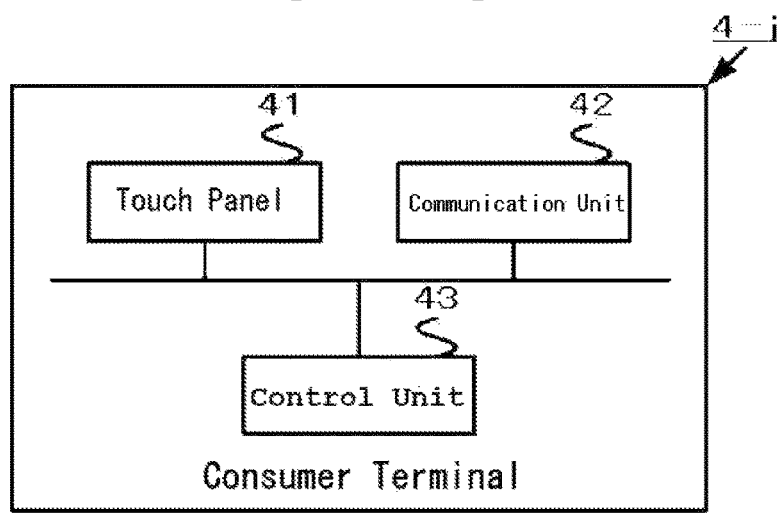
[FIG.15]

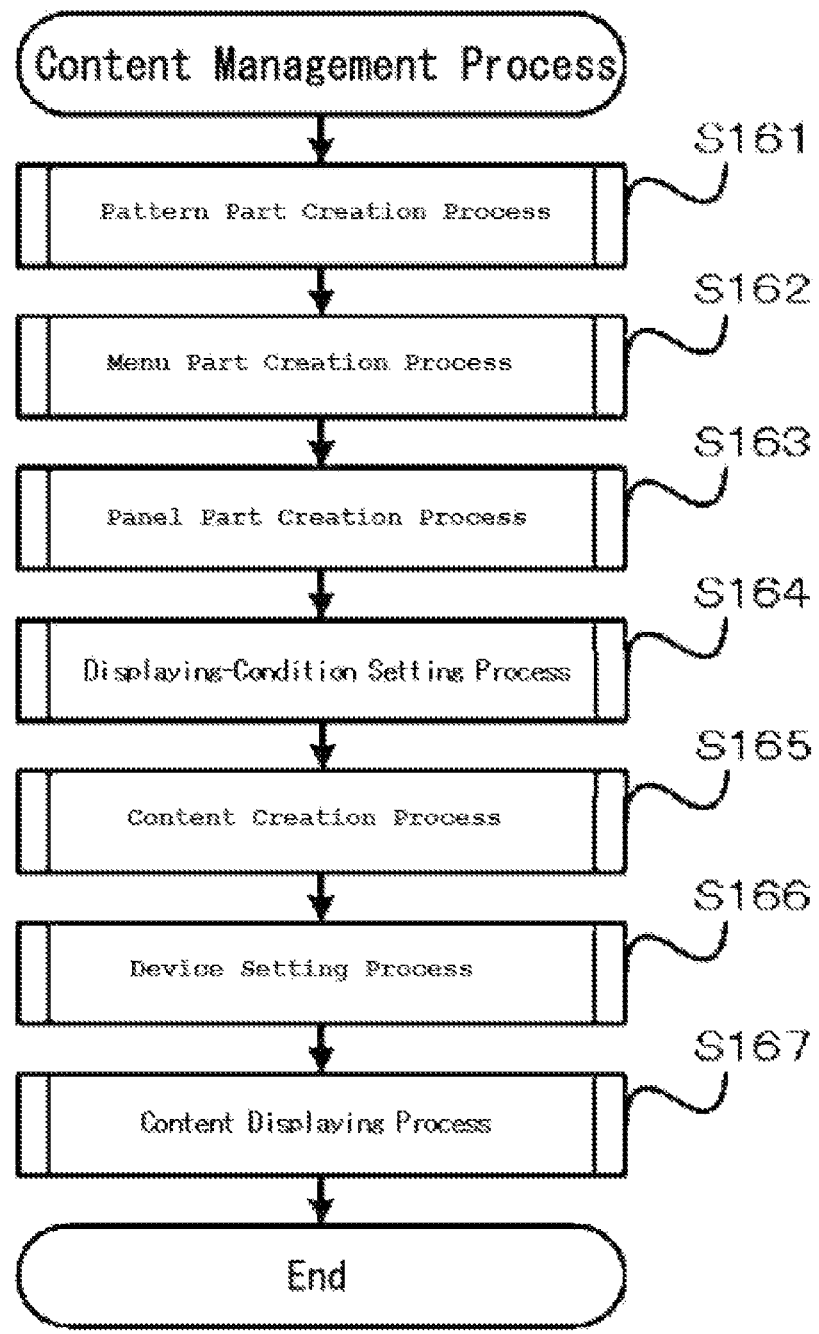
[FIG.16]

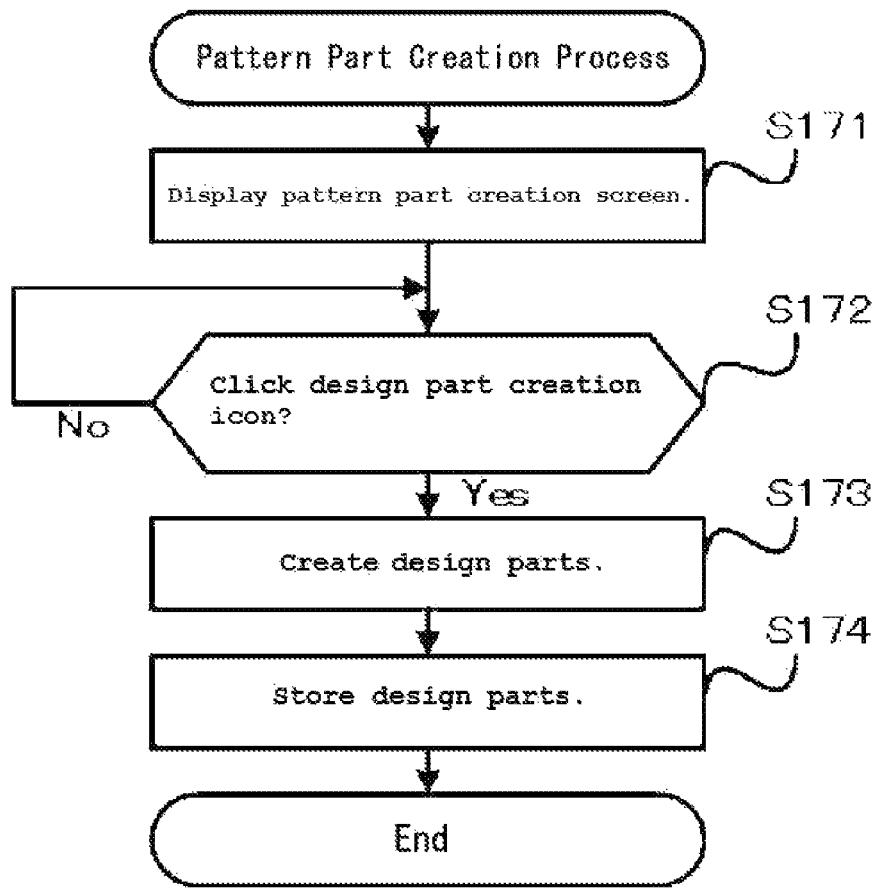
[FIG.17]
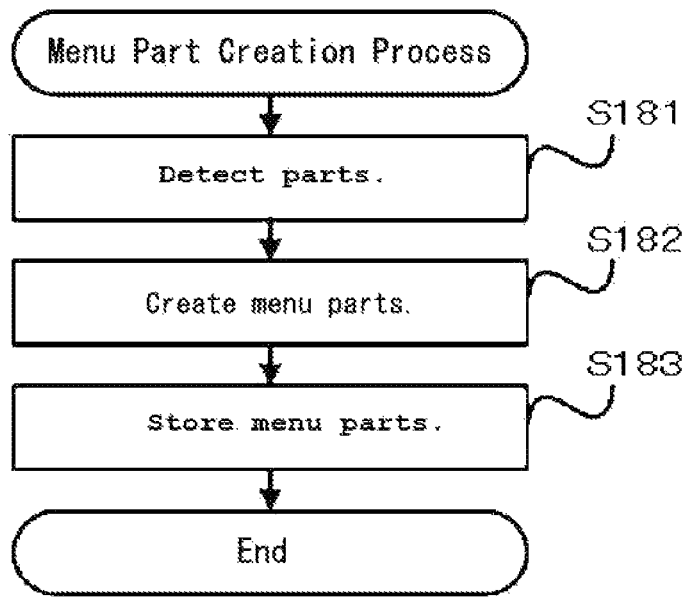
[FIG.18]

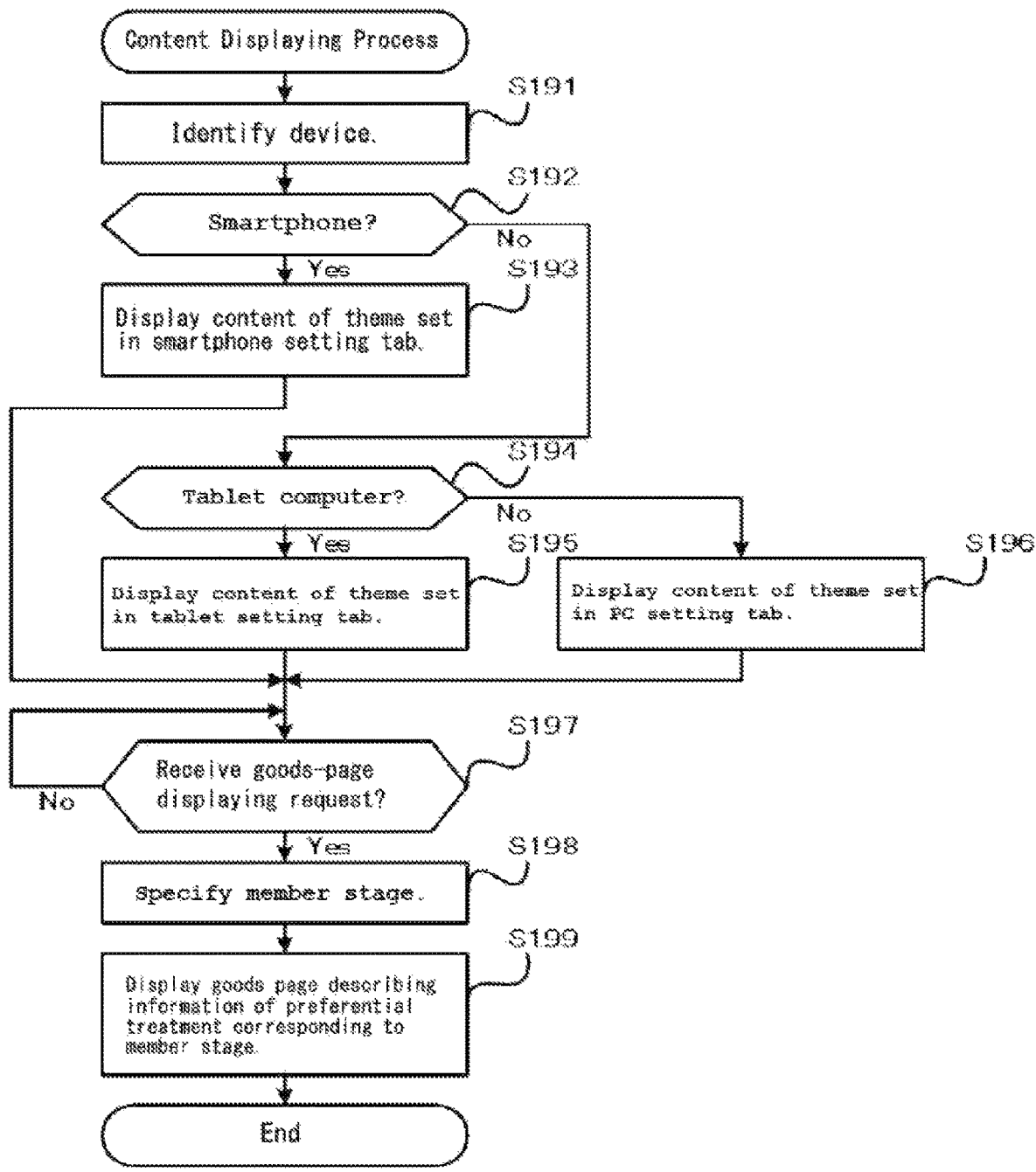
[FIG.19]

CONTENT MANAGEMENT APPARATUS, CONTENT MANAGEMENT METHOD, AND PROGRAM

RELATED APPLICATIONS

This application is the U.S. National Phase of and claims priority to International Patent Application No. PCT/JP2019/015867, International Filing Date Nov. 4, 2019; which claims benefit of Japanese Patent Application No. JP2018-097478 filed May 21, 2018; both of which are incorporated herein by reference in their entireties.

TECHNICAL FIELD

The present invention relates to a content management apparatus, a content management method and a program, and more particularly, to a content management apparatus, a content management method and a program capable of easily and safely creating content with a desired layout.

BACKGROUND ART

As a web page that is a part of an EC (Electronic Commerce) site, there is known a web page that defines an area in which content to be added independently by a user is displayed around (above, below, left, right, or between) content that needs to be controlled by the system.

There is also known a web page in which entire thereof can be edited. In this web page, a system control structure and content that is independently added by the user can be edited at the same time (see, for example, the patent document 1). Here, the system control structure is a portion controlled by the system of the EC site. Such a portion is, for example, a repetitive displaying or a conditional branch. The repetitive displaying is to display a part or all of information of goods that satisfy a condition on the goods list page up to the predetermined number. The conditional branch is to change indications of a goods page depending on the presence or absence of the number of stocks and the number of remaining stocks. The specification, claims, and drawings of the Patent Document 1 are incorporated herein by reference in their entirety.

RELATED ART DOCUMENT

Patent Document

Patent Document 1 is JP 2004-21838 A

SUMMARY OF THE INVENTION

Problems to be Solved by the Invention

In the former method, it is not possible to change the layout of the default content area, which may not be in line with the user's displaying purpose. Therefore, there is a problem that content representation of the EC site is restricted.

In the latter method, it is necessary to edit the content in addition to the system control structure, and the user is required to have knowledge of a unique description for realizing the system control structure. Further, in the latter method, if the user erroneously changes the system control structure, there is a possibility that electronic commerce cannot be properly realized.

The present invention has been made to solve the above problems, and it is an object of the present invention to provide a content management apparatus, a content management method and a program capable of easily and safely creating content with a desired layout.

Means of Solving the Problems

In order to achieve the above object, a content management apparatus (3) according to the first aspect of the present invention includes a storage unit (32) for storing a plurality of parts constituting a part of the content, and a content creation section (1020) for creating the content by combining the plurality of parts which are respectively arranged at desired positions and selected from the storage unit (32).

Further, in the content management apparatus (3), the parts include essential parts which are essential for displaying the content and are restricted from being edited by a user, and at least one optional part which can be arbitrarily added and is created by the user, and in which the content creation section (1020) may create the content by arranging the optional part between the essential parts.

Further, in the content management apparatus (3), the content creation section (1020) may rearrange the essential parts which are arranged at predetermined positions, and may arrange the optional part between the essential parts to create the content.

The content management apparatus (3) may further include a first optional part creation section (1010) for displaying an optional part creation screen corresponding to a format selected from among a plurality of types of formats prepared in advance, and creating the optional part corresponding to contents set in the optional part creation screen.

The content management apparatus (3) may further include a second optional part creation section (1010) which displays a menu setting screen for setting a group into which the optional part is classified as a menu, detects the optional part to be classified into the group set in the menu setting screen from the storage unit (32), links the detected optional part to the corresponding group, and creates a new optional part for displaying the group as the menu.

The content management apparatus (3) may further include a third optional part creation section (1010) which creates a new optional part by combining a plurality of optional parts which are respectively arranged at desired positions and selected from the storage unit (32).

The content management apparatus (3) may further include a content setting section (1030) for setting the content to be displayed on a device according to each type of devices, and a first content display section (1040) for specifying the type of the device in response to access from the device and displaying the content set so as to correspond to the type of the specified device on the device.

The content management apparatus (3) may further include a second content display section (1040) for displaying the content created by the content creation section (1020), and the content creation section (1020) may create the content by combining a first optional part displayed in a case of meeting a first condition with a second optional part displayed in a case of meeting a second condition different from the first condition, and the second content display section (1040) may display the first optional part in the content in the case of meeting the first condition, while may display the second optional part in the content in the case of meeting the second condition.

A content management method according to the second aspect of the present invention is a content management method with a content management apparatus (3) including a storage unit (32) for storing a plurality of parts constituting a part of content, and the method including a step of creating the content by combining the plurality of parts which are respectively arranged at desired positions and selected from the storage unit (32).

A program according to the third aspect of the present invention causes a computer of a content management apparatus (3) including a storage unit (32) for storing a plurality of parts constituting a part of content to create the content by combining the plurality of parts which are respectively arranged at desired positions and selected from the storage unit.

Effects of the Invention

According to the present invention, it is possible to provide the content management apparatus, the content management method and the program capable of easily and safely creating content with a desired layout.

BRIEF DESCRIPTION OF THE DRAWINGS

FIG. 1 is a block diagram showing a configuration example of a content management system.

FIG. 2 is a block diagram showing a configuration example of a business operator terminal.

FIG. 3 is a diagram showing a displaying example of a pattern part creation screen.

FIG. 4 is a diagram showing a displaying example of a menu part creation screen.

FIG. 5 is a diagram showing a displaying example of a panel part creation screen.

FIG. 6 is a diagram showing a displaying example of a theme list screen.

FIG. 7 is a diagram showing a displaying example of a layout setting screen of a goods page.

FIG. 8 is a diagram showing a displaying example of a device setting screen.

FIG. 9 is a block diagram showing a configuration example of a content management apparatus.

FIG. 10 is a block diagram exemplifying functions of a control unit.

FIG. 11 is a diagram showing an example of creating pattern parts.

FIG. 12 is a diagram showing an example of creating menu parts.

FIG. 13 is a diagram showing an example of creating panel parts.

FIG. 14 is a diagram showing an example of changing a layout.

FIG. 15 is a block diagram showing a configuration example of a consumer terminal.

FIG. 16 is a flowchart showing an example of a content management process.

FIG. 17 is a flowchart showing details of a pattern part creation process.

FIG. 18 is a flowchart showing details of a menu part creation process.

FIG. 19 is a flowchart showing details of a content displaying process.

MODE FOR CARRYING OUT THE INVENTION

Hereinafter, an embodiment for carrying out the present invention will be described.

First, a configuration of a content management system according to the embodiment of the present invention will be described with reference to the drawings.

The content management system according to the present embodiment is for constructing and operating EC (Electronic Commerce) sites of unique domains by using cloud computing.

In the present embodiment, unlike the so-called online shopping mall, each of the EC sites refers to an independent website for electronic commerce, which is configured and operated by each retailer (hereinafter simply referred to as "business operator") who is a user of the content management system using the domain under the management of the company. On such an EC site, various goods of multiple types are posted.

Further, the content refers to, for example, HTML (Hyper Text Markup Language) tags, images, stylesheets, appropriate displaying and data of goods information that is the main thing of electronic commerce, which constitute a web page that is a part of the EC site. The appropriate displaying includes not only indications of the goods information, but also designs such as decorations on the page. There are two types of the content in the EC site. The one type is "system content" that needs to be controlled by the content management system, such as goods information search, list displaying, detailed displaying, temporary storage, order and personal information management. The other type is "design content" that accompanies the goods information or store information that is independently added by the business operator. The content is managed by dividing it into units called "parts". Here, the parts of the system content are referred to as "system parts (essential parts)", and the parts of the design content are referred to as "design parts (optional parts)". It should be noted that the content of the present invention is not limited to the above, and may be optional as long as it can be displayed on a website.

FIG. 1 is a diagram showing a configuration example of a content management system according to the present embodiment.

As shown in FIG. 1, the content management system 1 includes a plurality of business operator terminals 2-1, 2-2, ..., 2-$i$ ($i$ is a natural number), a content management apparatus 3, and a plurality of consumer terminals 4-1, 4-2, ..., 4-$j$ ($j$ is a natural number), which are communicably connected to each other via a network N such as the Internet.

The business operator terminal 2-$i$ is composed of, for example, a general-purpose personal computer, a general-purpose tablet computer or a general-purpose smartphone. The business operator terminal 2-$i$ is for the business operator to perform various operations on the content management apparatus 3 via the network N.

FIG. 2 is a block diagram showing a configuration example of a business operator terminal.

As shown in FIG. 2, the business operator terminal 2-$i$ includes a display unit 21, an operation unit 22, a communication unit 23 and a control unit 24, which are connected to each other via a bus or the like.

The display unit 21 is composed of, for example, a general-purpose liquid crystal display device (Liquid Crystal Display: LCD). The display unit 21 displays, for example, a management screen for managing the content on a web browser.

In the present embodiment, the management screen includes a free part creation screen for the business operator to freely create the design parts by description methods such as HTML tags and CSS (Cascading Style Sheets), a format selection screen for selecting a format for creating the design parts, a pattern part creation screen for creating the design parts to be added independently according to the format selected by the business operator, a menu part creation screen for creating menu parts each of which links to each goods page of the EC site, a panel part creation screen for creating a new design part (hereinafter referred to as "panel part") from a plurality of design parts, a displaying-condition setting screen for setting a displaying condition for displaying each design part, and the like.

The management screen also includes a theme list screen for displaying a list of themes of the content displayed on the web page, a content selection screen for selecting the content whose layout is to be changed, a layout setting screen for arranging the system parts and the design parts at optional positions on the layout, a device setting screen, and the like.

FIG. 3 is a diagram showing a displaying example of a pattern part creation screen.

As shown in FIG. 3, the pattern part creation screen 300 displays, for example, text boxes 310 for inputting, e.g. "name", "heading", "body of a message" and "link destination" of the design parts, an image box 320 for selecting an image to be displayed on the web page, and a design part creation icon 330 for instructing creation of the design parts according to the format selected by the business operator.

In addition, the pattern part creation screen 300 may display the text box 310 for inputting "group information" according to the format selected by the business operator. Here, the group information indicates a group into which each of the goods is classified. For example, in the group information of the design parts of the goods such as "cut and sewn", "T-shirt" and "tank top", "tops" is input as the group into which these goods are classified. Further, in the group information of the design parts of the goods such as "regular" and "button down", "shirts" is input as the group into which these goods are classified.

FIG. 4 is a diagram showing a displaying example of a menu part creation screen.

As shown in FIG. 4, in the menu part creation screen 400, the group information such as "tops", "bottoms", "suits", "shirts", "ties", "outerwear" and "miscellaneous goods" is set as menus 410, and a menu part creation icon 420 for instructing creation of menu parts and the like are displayed.

FIG. 5 is a diagram showing a displaying example of a panel part creation screen.

As shown in FIG. 5, in the panel part creation screen 500, a plurality of design parts 510 such as "menu over banner", "menu", and "menu under banner" are respectively arranged at optional positions, and a panel part creation icon 520 for instructing creation of a panel part and the like are displayed.

FIG. 6 is a diagram showing a displaying example of a theme list screen.

As shown in FIG. 6, themes 610-1, 610-2, . . . , 610-$k$ ($k$ is a natural number) are displayed in a list on the theme list screen 600. The themes 610-$k$ include smartphone themes usable for displaying of smartphones, tablet themes usable for displaying of tablet computers, PC (Personal Computer) themes usable for displaying of personal computers, tablet/PC themes usable for displaying of tablet computers and personal computers, and commonly used themes usable for displaying of any devices such as smartphones, tablet computers and personal computers. Further, each of the themes 610-$k$ is provided with a layout setting icon 611-$k$ for setting the layout of the design content of the theme. Furthermore, the theme list screen 600 is provided with a device setting icon 620 for setting the theme to be displayed on each device.

FIG. 7 is a diagram showing a displaying example of a layout setting screen of a goods page.

As shown in FIG. 7, on a layout setting screen 700 of a goods page, a plurality of system parts 710 that need to be controlled by the content management system 1, such as "goods-name displaying section 711", "goods-price displaying section 712", "goods-image displaying section 713", "goods variation selection and adding to cart button 714" and "goods-description displaying section 715", and design parts 720 that are independently added by the business operator, such as "goods-supplementary-information displaying section 721", "goods-price-supplementary-information displaying section 722" and "goods-order-supplementary-information displaying section 723" are respectively arranged at optional positions, and a content creation icon 730 for instructing creation of content and the like are displayed.

FIG. 8 is a diagram showing a displaying example of a device setting screen.

As shown in FIG. 8, a device setting screen 800 is provided with a smartphone setting tab 810 for setting content to be displayed on smartphones, a tablet setting tab 820 for setting content to be displayed on tablet computers, a PC setting tab 830 for setting content to be displayed on personal computers and the like.

The operation unit 22 shown in FIG. 2 is composed of, for example, a general-purpose keyboard or a general-purpose mouse. The operation unit 22 is operated by the business operator.

The business operator accesses the content management apparatus 3 by, for instance, operating the operation unit 22 and inputting the URL (Uniform Resource Locator) of the content management apparatus 3 on the web browser displayed on the display unit 21.

On the format selection screen, the business operator operates the operation unit 22 to select a format to be used for creating the design parts from among a plurality of types of formats on the content management apparatus 3 via the network N.

In the pattern part creation screen 300 shown in FIG. 3, the business operator operates the operation unit 22 to input, e.g. a name, a heading, a body of a message, a link destination and group information of the design parts into the corresponding text boxes 310, select an image to be displayed on a web page in the image box 320, and then click the design part creation icon 330 on the content management apparatus 3 via the network N.

In the menu part creation screen 400 shown in FIG. 4, the business operator operates the operation unit 22 to set the group information as the menus 410, and then click the menu part creation icon 420 on the content management apparatus 3 via the network N.

In the panel part creation screen 500 shown in FIG. 5, the business operator operates the operation unit 22 to arrange the plurality of design parts 510 at optional positions respectively, and then click the panel part creation icon 520 on the content management apparatus 3 via the network N.

In the displaying-condition setting screen, the business operator can operate the operation unit 22 to set the displaying condition of each design part on the content management apparatus 3 via the network N. The displaying condition can be, for example, a wide range of information performed at the EC site such as data of consumers, attribute information of goods or the fact that each of the consumers currently stores goods in a list of goods to be purchased. The displaying condition may be set by a simple operation such as inputting the number or selecting an option from a plurality of items prepared in advance.

In the theme list screen 600 shown in FIG. 6, the business operator operates the operation unit 22 to click the layout setting icon 611-k, the device setting icon 620 and the like on the content management apparatus 3 via the network N.

In the content selection screen, the business operator operates the operation unit 22 to select content whose layout is to be changed on the content management apparatus 3 via the network N.

In the layout setting screen 700 shown in FIG. 7, the business operator operates the operation unit 22 to change the arrangement order of the system parts 710, arrange the design parts 720 between the system parts 710, and then click the content creation icon 730 on the content management apparatus 3 via the network N.

In the device setting screen 800 shown in FIG. 8, the business operator operates the operation unit 22 to select a theme of content to be displayed on smartphones with the smartphone setting tab 810, a theme of content to be displayed on tablet computers with the tablet setting tab 820 and a theme of content to be displayed on personal computers with the PC setting tab 830 respectively on the content management apparatus 3 via the network N. Specifically, in a case of displaying the content corresponding to each of devices, the smartphone theme may be selected with the smartphone setting tab 810, the tablet theme may be selected with the tablet setting tab 820, and the PC theme may be selected with the PC setting tab 830. On the other hand, in a case of displaying the content common to each device, the commonly used theme may be selected with the smartphone setting tab 810, the tablet setting tab 820 and the PC setting tab 830. As a result, the business operator can prepare the content for each device, or can prepare only one content commonly used for the devices.

The communication unit 23 shown in FIG. 2 is configured to include, for example, a general-purpose communication device such as a NIC (Network Interface Card). In the present embodiment, the communication unit 23, for instance, receives screen-displaying data for displaying the management screen transmitted from the content management apparatus 3 via the network N, and transmits an operation signal corresponding to the operation of the operation unit 22 by the business operator to the content management apparatus 3 via the network N.

The control unit 24 is composed of, for example, a CPU (Central Processing Unit), a ROM (Read Only Memory) and a RAM (Random Access Memory). The CPU controls the operation of each unit of the business operator terminal 2-i by using the RAM as a work memory and appropriately executing various programs and the like stored in the ROM.

In the present embodiment, the control unit 24 displays the management screen based on the screen-displaying data on the web browser in response to receiving the screen-displaying data transmitted from the content management apparatus 3 via the network N by the communication unit 23. In addition, the control unit 24 transmits the operation signal corresponding to the operation of the operation unit 22 by the business operator from the communication unit 23 to the content management apparatus 3 via the network N, thereby enabling the business operator to perform various operations on the content management apparatus 3 via the network N.

The content management apparatus 3 shown in FIG. 1 is composed of, for example, a general-purpose server computer or the like, and manages various data.

FIG. 9 is a block diagram showing a configuration example of a content management apparatus.

As shown in FIG. 9, the content management apparatus 3 includes a communication unit 31, a storage unit 32 and a control unit 33, which are connected to each other via a bus or the like.

The communication unit 31 is configured to include, for example, a general-purpose communication device such as a NIC. In the present embodiment, the communication unit 31, for instance, receives the operation signal transmitted from the business operator terminal 2-i via the network N and a goods-page displaying request transmitted from the consumer terminal 4-j via the network N, and transmits the screen-displaying data to the content management apparatus 3 and the consumer terminal 4-j via the network N.

The storage unit 32 is composed of, for example, a general-purpose storage device such as a hard disk drive, and stores content management software for managing the content to be displayed on a web page that is a part of the EC site. In addition, the storage unit 32 stores the design parts, the content and the like created by the business operator via the network N.

The storage unit 32 stores member information DB (Date-Base) for registering information of consumers who are members of the EC site. The member information DB registers, for each consumer who is the member, login information for the consumer to log in to the EC site such as an email address and a password, a member stage of the consumer, the list of goods to be purchased for the consumer to store the goods to be purchased and data such as access state of the consumer in association with each other. Here, the member stage is an attribute which is set in advance based on the purchase amount and the number of purchases of the consumer who is the member, and is for giving preferential treatment such as discount to consumers of higher-ranking attributes. In the present embodiment, any one of attributes including "bronze member", "silver member" and "gold member" is assigned to each consumer, which are stored in the storage unit 32 in association with each other.

The control unit 33 is composed of, for example, a CPU, a ROM and a RAM. The CPU controls the operation of each unit of the content management apparatus 3 by using the RAM as a work memory and appropriately executing various programs stored in the ROM, various software stored in the storage unit 32 and the like.

In the present embodiment, the control unit 33 transmits the screen-displaying data from the communication unit 31 to the business operator terminal 2-i via the network N, so that various management screens are displayed on the web browser of the business operator terminal 2-i. In addition, the control unit 33 receives the operation signal transmitted from the business operator terminal 2-i via the network N, so that the business operator can perform the operation corresponding to the operation signal on the content management apparatus 3 via the network N.

The control unit 33 executes the content management software stored in the storage unit 32 to realize various functions for managing the content.

FIG. 10 is a functional block diagram of a control unit.

By executing the content management software, the control unit 33 functions as a design part creation section 1010, a content creation section 1020, a device setting section 1030, a content display section 1040 and the like as shown in FIG. 10.

In response to the business operator selecting a format to be used for creating the design parts from the plurality of types of formats in the format selection screen, the design part creation section 1010 transmits screen-displaying data for displaying the pattern part creation screen 300 corresponding to the format to the business operator terminal 2-*i* via the network N from the communication unit 31, so that the pattern part creation screen 300 shown in FIG. 3 corresponding to the format selected by the business operator is displayed on the web browser of the business operator terminal 2-*i*.

The design part creation section 1010 creates and stores the design parts in the storage unit 32 in response to the business operator clicking the design part creation icon 330 after inputting, e.g. a name, a heading, a body of a message, a link destination and group information of the design parts into the corresponding text boxes 310 in the pattern part creation screen 300 and selecting an image to be displayed on a web page with the image box 320.

FIG. 11 is a diagram showing an example of creating a design part.

In a case where, in the design part creation screen 300 shown in FIG. 3, the text boxes 310 of "name", "heading", "body of a message" and "link destination" are respectively input with "menu over banner", "decide to hold a Special SALE!", "We are grateful for your patronage and will hold a Special SALE." and "http://example.com/sale/lp.html", and the image of "Special SALE" is selected at the image box 320, the design part 1100 shown in FIG. 11 is created. As shown in FIG. 11, the heading 1110 and the body 1120 input in the text boxes 310 and the image 1130 selected with the image box 320 are displayed in the design part 1100, and when the image 1130 is clicked, it moves to the link destination input in the text box 310.

Thus, the business operator can create the design part of the content for the EC site by a simple operation such as selecting a format of the design parts, inputting characters in the text boxes 310, selecting an image with the image box 320 or the like on the GUI (Graphical User Interface) of the display unit 21, even if the business operator does not have sufficient knowledge or skills on the description methods such as HTML tag and CSS, or even if there is no budget to place an order with a specialist.

In response to the business operator clicking the menu part creation icon 420 after setting the group information as the menus 410 on the menu part creation screen 400 shown in FIG. 4, the design part creation section 1010 shown in FIG. 10 detects, for each group information set by the business operator, design parts registered with the group information from the storage unit 32. Then, the design part creation section 1010 links the design parts detected from the storage unit 32 to the corresponding group information, creates the menu parts and stores them in the storage unit 32.

FIG. 12 is a diagram showing an example of creating menu parts.

In the menu part creation screen 400 shown in FIG. 4, when the group information such as "tops", "bottoms", "suits", "shirts", "ties", "outerwear" and "miscellaneous goods" is set as "men's menu", a men's menu part 1200*a* for displaying a men's menu 1210*a* as shown in FIG. 12 (*a*) is created. In the men's menu 1210*a*, the menu of "tops" is displayed with links to the design parts such as "cut and sewn", "T-shirt" and "tank top" of goods classified into the group, and the menu of "shirts" is displayed with links to the design parts such as "regular" and "button down" of goods classified into the group. On the other hand, when the group information such as "tops", "bottoms", "skirts", "one pieces", "shirts", "outerwear" and "miscellaneous goods" is set as "women's menu" in the menu part creation screen 400 shown in FIG. 4, a women's menu part 1200*b* displaying a women's menu 1210*b* as shown in FIG. 12 (*b*) is created.

Thus, the business operator can create the menu parts to be linked to each part simply by registering the group information as the menus.

The design part creation section 1010 shown in FIG. 10 creates the panel part in response to the business operator clicking the panel part creation icon 520 after arranging the plurality of design parts 510 at optional positions on the panel part creation screen 500 shown in FIG. 5, and stores the panel part in the storage unit 32.

FIG. 13 is a diagram showing an example of creating panel parts.

When the design parts 510 of "menu over banner", "men's menu" and "menu under banner" are arranged in this order from the top in the panel part creation screen 500 shown in FIG. 5, a men's panel part 1300*a* shown in FIG. 13 (*a*) is created. In the men's panel part 1300*a*, the menu over banner 1310, the men's menu 1210*a* and the menu under banner 1320 are arranged in this order from the top. On the other hand, when the design parts 510 of "menu over banner", "women's menu" and "menu under banner" are arranged in order from the top in the panel part creation screen 500 shown in FIG. 5, a women's panel part 1300*b* shown in FIG. 13 (*b*) is created. In the women's panel part 1300*b*, the menu over banner 1310, the women's menu 1210*b* and the menu under banner 1320 are arranged in this order from the top.

Thus, the business operator can create a new design part (panel part) by arbitrarily determining the number and arrangement of the design parts without any difference from a creation thereof by directly inputting HTML tags. Further, the design part creation section 1010 can easily create two panel parts having different menus while keeping the menu over banner 1310 and the menu under banner 1320 displayed in common by inserting the different design part 510 such as "men's menu" or "women's menu" between the two common design parts 510 such as "menu over banner" and "menu under banner" in a so-called nesting state in the panel part creation screen 500 shown in FIG. 5. Further, the business operator can edit the two panel parts at once by editing the menu over banner 1310 and the menu under banner 1320 which are commonly displayed on the free part creation screen or the pattern part creation screen 300 shown in FIG. 3.

The design part creation section 1010 shown in FIG. 10 stores the displaying conditions of the design parts set on the displaying-condition setting screen by the business operator in the storage unit 32 in association with the design parts. In the present embodiment, in the free part creation screen or the pattern part creation screen 300 shown in FIG. 3, the business operator creates the design parts describing information of the preferential treatment for each member stage. Then, in the displaying-condition setting screen, the business operator sets the corresponding member stage as the displaying condition of each of the design parts describing the information of the preferential treatment. Specifically, the "bronze member" is set as the displaying condition for the design part describing the information of the preferential treatment for bronze members, that is, "granting free shipping coupon". Further, the "silver member" is set as the displaying condition for the design part describing the information of the preferential treatment for silver members, that is, "granting free shipping coupon and granting 5% discount coupon in the month of birth". Furthermore, the "gold member" is set as the displaying condition for the design part describing the information of the preferential treatment for gold members, that is, "granting free shipping coupon and granting 10% discount coupon in the month of birth". In addition, the "general consumer" is set as the displaying condition for the design part describing the information of the preferential treatment for general consumers who have not registered as members, that is, "If you register as a member, you will receive a coupon according to the number of purchases and the purchase amount".

Conventionally, in order to dynamically change content itself of an EC site according to the behavior of consumers and goods, a method involving programming of scripts that run on a web browser was often adopted, but this was very difficult for non-knowledgeable business operators. According to the content management apparatus 3 of the present embodiment, since the business operator can set the displaying condition by a simple operation such as inputting the number or selecting an option from a plurality of items prepared in advance, it is possible to easily realize dynamic change of the content itself of the EC site according to the behavior of consumers or goods.

The content creation section 1020 transmits screen-displaying data for displaying the content selection screen from the communication unit 31 to the business operator terminal 2-*i* via the network N in response to the business operator clicking the layout setting icon 611-*k* in the theme list screen 600 shown in FIG. 6, so that the content selection screen is displayed on the web browser of the business operator terminal 2-*i*. Next, in response to the business operator selecting content whose layout is to be changed on the content selection screen, the content creation section 1020 transmits screen-displaying data for displaying the layout setting screen 700 corresponding to the content from the communication unit 31 to the business operator terminal 2-*i* via the network N, so that the layout setting screen 700 shown in FIG. 7 corresponding to the content selected by the business operator is displayed on the web browser of the business operator terminal 2-*i*. Then, in response to the click of the content creation icon 730 after the business operator arranges the system parts 710 and the design parts 720 at optional positions in the layout setting screen 700, the content creation section 1020 combines the system parts 710 and the design parts 720 to create content to be displayed on the web page and stores the content in the storage unit 32.

Here, the system parts 710 are different from the design parts 720 that can be independently added by the business operator, in that the system parts 710 cannot be arbitrarily changed by the business operator in the free part creation screen, the pattern part creation screen 300, the menu creation screen 400, the panel part creation screen 500 and the like. As a result, it is possible to prevent an accident in which the business operator erroneously changes a control structure for establishing the system parts 710, and it is possible to change or add a function to the system parts 710 in the future. Such as the setting of the displaying condition, that is, a part which can guarantee the operation of the content management system 1 even if it is changed may be implemented in advance as a function of the content management system 1 so as to separately prepare a displaying-condition setting screen or the like to change it.

FIG. 14 is a diagram showing an example of changing a layout.

As shown in FIG. 14 (*a*), in the default, in the layout setting screen 700 of a goods page, only the system parts 710 such as "goods-name displaying section 711", "goods-price displaying section 712", "goods-image displaying section 713", "goods variation selection and adding to cart button 714" and "goods-description displaying section 715" are arranged so as to be displayed on the goods page in order from the top. Then, in the layout setting screen 700 of the goods page, the arrangement order of the system parts 710 in the default is changed, and the design parts 720 are arranged between the system parts 710, so that "goods-supplementary-information displaying section 721", "goods-name displaying section 711", "goods-description displaying section 715", "goods-price displaying section 712", "goods-price-supplementary-information displaying section 722", "goods variation selection and adding to cart button 714", "goods-order-supplementary-information displaying section 723" and "goods-image displaying section 713" are displayed on the goods page in order from the top, for example, as shown in FIG. 14 (*b*).

In this way, in the layout setting screen 700, the system parts 710 are also arranged in the same row as the design parts 720, so that the system parts 710 can be safely arranged with the design parts 720. As a result, particularly in a goods page whose layout is considered to be strongly requested for changing it, the business operator can arbitrarily change the layout of the goods page by arranging the system parts 710 and the design parts 720 at optional positions. As a result, even if the business operator does not understand the description methods such as HTML tag and CSS, the business operator can arrange the plurality of system parts 710 and design parts 720 at optional positions by using the GUI of the display unit 21 to create content. Further, since the system parts 710 are divided in advance, it is easy for the business operator to think about an arrangement thereof and easily change the arrangement. Furthermore, since the design parts 720 can be arranged between the system parts 710, this makes it possible to easily display contents so as to supplement contents described in the system parts 710 as an example. In addition, such a layout-changing function can not only change the arrangement but also increase the degree of freedom in design processing for giving colors, frame lines and the like.

Further, when the design parts which have different information of the preferential treatment and are respectively set with the different member stages as the displaying conditions are arranged side by side in the layout setting screen 700, a goods page displaying the different information of the preferential treatment according to the member stages of the consumers is created. In this manner, the business operator can realize the conditional branch in which the different information of the preferential treatment is displayed according to the member stages of the consumers by a simple condition setting for arranging the design parts having the different displaying conditions side by side in the layout setting screen 700.

In response to the business operator clicking the device setting icon 620 in the theme list screen 600 shown in FIG. 6, the device setting section 1030 shown in FIG. 10 transmits screen-displaying data for displaying the device setting screen 800 from the communication unit 31 to the business operator terminal 2-*i* via the network N, so that the device setting screen 800 shown in FIG. 8 is displayed on the web browser of the business operator terminal 2-*i*. In the device setting screen 800, the device setting section 1030 sets a theme selected by the business operator with the smartphone setting tab 810 as the theme of content to be displayed when the device is a smartphone, sets a theme selected by the business operator with the tablet setting tab 820 as the theme of content to be displayed when a tablet computer is used and sets a theme selected by the business operator with the PC setting tab 830 as the theme of content to be displayed when a personal computer is used.

In response to the consumer terminal 4-*j* accessing the EC site via the network N, the content display section 1040 determines whether the consumer terminal 4-*j* is a smartphone, a tablet computer or a personal computer. When it is determined that the consumer terminal 4-*j* is a smartphone, the content display section 1040 transmits screen-displaying data for displaying the content of the theme set in the smartphone setting tab 810 from the communication unit 31 to the consumer terminal 4-*j* via the network N. Further, when it is determined that the consumer terminal 4-*j* is a tablet computer, the content display section 1040 transmits screen-displaying data for displaying the content of the theme set in the tablet setting tab 820 from the communication unit 31 to the consumer terminal 4-*j* via the network N. On the other hand, when it is determined that the consumer terminal 4-*j* is a personal computer, the content display section 1040 transmits screen-displaying data for displaying the content of the theme set in the PC setting tab 830 from the communication unit 31 to the consumer terminal 4-*j* via the network N.

In response to the communication unit 31 receiving a goods-page displaying request transmitted from the consumer terminal 4-*j* via the network N, the content display section 1040 specifies the member stage of the consumer specified from the goods-page displaying request from among the member information DB. The content display section 1040 transmits screen-displaying data for displaying the goods page in which the information of the preferential treatment corresponding to the member stage is described from the communication unit 31 to the consumer terminal 4-*j* via the network N.

The consumer terminal 4-*j* shown in FIG. 1 is composed of, for example, a general-purpose personal computer, a general-purpose tablet computer or a general-purpose smartphone. The consumer terminal 4-*j* is used by the consumer to access the EC site.

FIG. 15 is a block diagram showing a configuration example of a consumer terminal.

As shown in FIG. 15, the consumer terminal 4-*j* includes a touch panel 41, a communication unit 42 and a control unit 43, which are connected to each other via a bus or the like.

The touch panel 41 is composed of, for example, a general-purpose touch panel in which a liquid crystal display device and a pointing device are combined. The touch panel 41 displays various screens and accepts various operations performed by the consumer. In the present embodiment, the consumer operates the touch panel 41 to access the EC site or instruct to display a goods page. The goods page or the like is displayed on the web browser in the touch panel 41.

The communication unit 42 is configured to include, for example, a general-purpose communication device such as a NIC. In the present embodiment, the communication unit 42 receives, for example, the screen-displaying data for displaying the management screen transmitted from the content management apparatus 3 via the network N, or transmits the goods-page displaying request requesting the indication of the goods page via the network N.

The control unit 43 is composed of, for example, a CPU, a ROM and a RAM. The CPU controls the operation of each unit of the consumer terminal 4-*j* by using the RAM as a work memory and appropriately executing various programs and the like stored in the ROM.

In the present embodiment, the control unit 43 accesses the EC site from the communication unit 42 via the network N. In response to the communication unit 42 receiving screen-displaying data transmitted from the content management apparatus 3 via the network N, the control unit 43 displays content based on the screen-displaying data on the web browser. Specifically, when the consumer terminal 4-*j* is a smartphone, the control unit 43 displays the content of the theme set in the smartphone setting tab 810 on the web browser. Further, when the consumer terminal 4-*j* is a tablet computer, the control unit 43 displays the content of the theme set in the tablet setting tab 820 on the web browser. Furthermore, when the consumer terminal 4-*j* is a personal computer, the control unit 43 displays the content of the theme set in the PC setting tab 830. For example, when the smartphone theme is set in the smartphone setting tab 810, the tablet theme is set in the tablet setting tab 820 and the PC theme is set in the PC setting tab 830, the content corresponding to each device is respectively displayed on the web browser of the consumer terminal 4-*j*. On the other hand, when the common use theme is set in all of the smartphone setting tab 810, the tablet setting tab 820 and the PC setting tab 830, the content common to each device is displayed on the web browser of the consumer terminal 4-*j*.

In response to the consumer's instruction to display a goods page with the touch panel 41, the control unit 43 transmits the goods-page displaying request capable of specifying the consumer from the communication unit 42 to the content management apparatus 3 via the network N. Then, in response to the communication unit 42 receiving screen-displaying data transmitted from the content management apparatus 3 via the network N, the control unit 43 displays the goods page on the web browser based on the screen-displaying data, in which the information of the preferential treatment corresponding to the member stage of the consumer is described. Specifically, when the member stage of the consumer is the bronze member, the goods page is displayed on the web browser describing the information of the preferential treatment for bronze members, that is, "granting free shipping coupon". Further, when the member stage of the consumer is the silver member, the goods page is displayed on the web browser describing the information of the preferential treatment for silver members, that is, "granting free shipping coupon and granting 5% discount coupon in the month of birth". Furthermore, when the member stage of the consumer is the gold member, the goods page is displayed on the web browser describing the information of the preferential treatment for gold members, that is, "granting free shipping coupon and granting 10% discount coupon in the month of birth". In addition, when the consumer is the general consumer who has not registered as a member, the goods page is displayed on the web browser describing the information of the preferential treatment for general consumers, that is, "If you register as a member, you will receive a coupon according to the number of purchases and the purchase amount". It should be noted that the conditional branches of a plurality of layers can also be realized by the "nesting" function for the panel part described above.

Next, the operation of the content management system having the above configurations will be described with reference to the drawings.

FIG. 16 is a flowchart showing an example of a content management process.

In the content management process shown in FIG. 16, in response to the business operator selecting a format to be used for creating the design parts from a plurality of types of formats in the format selecting screen, the design part creation section 1010 starts a pattern part creation process (step S161).

FIG. 17 is a flowchart showing details of the pattern part creation process.

In the pattern part creation process shown in FIG. 17, first, the design part creation section 1010 displays the pattern part creation screen 300 shown in FIG. 3 corresponding to the format selected by the business operator on the web browser of the business operator terminal 2-*i* (step S171).

Next, the design part creation section 1010 creates design parts in response to the business operator clicking the design part creation icon 330 (step S172; Yes) after inputting, e.g. the name, the heading, the body of the message, the link destination and the group information of the design parts into the corresponding text boxes 310 in the pattern part creation screen 300, and selecting the image to be displayed on the web page at the image box 320 (step S173).

The design part creation section 1010 stores the design parts created in step S173 in the storage unit 32 (step S174), and then ends the pattern part creation process.

In addition, in the content management process shown in FIG. 16, the design part creation section 1010 starts a menu part creation process in response to the business operator clicking the menu part creation icon 420 after setting the group information as the menus 410 in the menu part creation screen 400 shown in FIG. 4 (step S162).

FIG. 18 is a flowchart showing details of the menu part creation process.

In the menu-part creation process shown in FIG. 18, first, the design part creation section 1010 detects the design parts registered with the group information from the storage unit 32 for each group information set by the business operator (step S181).

Next, the design part creation section 1010 links the design parts detected in step S181 to the corresponding group information to create menu parts (step S182).

Further, the design part creation section 1010 stores the menu parts created in step S182 in the storage unit 32 (step S183), and then ends the menu part creation process.

Furthermore, in the content management process shown in FIG. 16, in response to the business operator clicking the panel part creation icon 520 after arranging the plurality of design parts 510 at optional positions in the panel part creation screen 500 shown in FIG. 5, the design part creation section 1010 executes a panel part creation process for creating panel parts and storing the panel parts in the storage unit 32 (step S163).

The design part creation section 1010 executes a displaying-condition setting process for storing the displaying condition of each of the design parts set in the displaying-condition setting screen by the business operator in the storage unit 32 in association with the design part (step S164).

The content creation section 1020 displays the content selection screen on the web browser of the business operator terminal 2-*i* in response to the business operator clicking the layout setting icon 611-*k* in the theme list screen 600 shown in FIG. 6. Next, in response to the business operator selecting content whose layout is to be changed in the content selection screen, the content creation section 1020 displays the layout setting screen 700 shown in FIG. 7 corresponding to the content selected by the business operator on the web browser of the business operator terminal 2-*i*. Then, in response to the business operator clicking the content creation icon 730 after arranging the system parts 710 and the design parts 720 at optional positions in the layout setting screen 700, the content creation section 1020 executes a content creation process for combining the system parts 710 and the design parts 720 to create content to be displayed on the web page and storing the content in the storage unit 32 (step S165).

Moreover, in response to the business operator clicking the device setting icon 620 in the theme list screen 600 shown in FIG. 6, the device setting section 1030 displays the device setting screen 800 shown in FIG. 8 on the web browser of the business operator terminal 2-*i*. In the device setting screen 800, the device setting section 1030 performs a device setting process for setting a theme selected by the business operator with the smartphone setting tab 810 as the theme of the content to be displayed when the device is a smartphone, setting a theme selected by the business operator with the tablet setting tab 820 as the theme of the content to be displayed when the tablet computer is used and setting a theme selected by the business operator with the PC setting tab 830 as the theme of the content to be displayed when the personal computer is used (step S166).

Thereafter, the content display section 1040 starts a content displaying process in response to the consumer terminal 4-*j* accessing the EC site via the network N (step S167).

FIG. 19 is a flowchart showing details of the content displaying process.

In the content displaying process shown in FIG. 19, first, the content displaying section 1040 determines whether the consumer terminal 4-*j* that has accessed the EC site is a smartphone, a tablet computer or a personal computer (step S191).

When it is determined that the consumer terminal 4-*j* is a smartphone (step S192: Yes), the content display section 1040 transmits screen-displaying data for displaying content of the theme set in the smartphone setting tab 810 from the communication unit 31 to the consumer terminal 4-*j* via the network N, so that the content of the theme set in the smartphone setting tab 810 is displayed on the web browser of the consumer terminal 4-*j* (step S193).

On the other hand, when it is determined that the consumer terminal 4-*j* is a tablet computer (step S192: No, step S194: Yes), the content display section 1040 transmits screen-displaying data for displaying content of the theme set in the tablet setting tab 820 from the communication unit 31 to the consumer terminal 4-*j* via the network N, so that the content of the theme set in the tablet setting tab 820 is displayed on the web browser of the consumer terminal 4-*j* (step S195).

On the other hand, when it is determined that the consumer terminal 4-*j* is a personal computer (step S194: No), the content display section 1040 transmits screen-displaying data for displaying content of the theme set in the PC setting tab 830 from the communication unit 31 to the consumer terminal 4-*j* via the network N, so that the content of the theme set in the PC setting tab 830 is displayed on the web browser of the consumer terminal 4-*j* (step S196).

After that, in response to receiving a goods-page displaying request transmitted from the consumer terminal 4-*j* via the network N (step S197: Yes), the content display section 1040 specifies the member stage of the consumer specified from the goods-page displaying request from among the member information DB (step S198).

Then, the content display section 1040 transmits screen-displaying data for displaying a goods page in which the information of the preferential treatment corresponding to the member stage specified in step S198 is described from the communication unit 31 to the consumer terminal 4-*j* via the network N, so that the goods page describing the information of the preferential treatment corresponding to the member stage of the consumer is displayed on the web browser of the consumer terminal 4-*j* (step S199), and then terminates the content displaying process.

As described above, the content management apparatus 3 according to the present embodiment includes the storage unit 32 for storing the plurality of parts constituting a part of content, and the content creation section 1020 for creating the content by combining the plurality of parts which are respectively arranged at desired positions and selected from the storage unit 32. As a result, the business operator can easily and safely create the content with a desired layout by arranging the plurality of parts at optional positions without having specialized knowledge on the description methods such as HTML tag and CSS.

The parts include the system parts, that is, the essential parts which are essential for displaying the content and are restricted from being edited by the business operator who is a user and the design parts, that is, the optional parts which are created and can be added arbitrarily by the business operator who is a user. Then, the content creation section 1020 rearranges the system parts which are arranged at predetermined positions, and arranges the design parts between the system parts to create the content. As a result, it is possible to easily and safely create the content with the desired layout while preventing an accident in which the business operator erroneously changes a control structure for establishing the system parts 710.

The content management apparatus 3 further includes the design part creation section 1010. The design part creation section 1010 displays the pattern part creation screen 300 corresponding to the selected format from the plurality of types of formats prepared in advance, and creates the design parts corresponding to contents set in the pattern part creation screen 300. As a result, the business operator can create the design parts by a simple operation such as selecting a format and setting the contents in the pattern part creation screen 300, even if the business operator does not have sufficient knowledge or skills on the description methods such as HTML tag and CSS, or even if there is no budget to place an order with a specialist.

In addition, the design part creation section 1010 displays the menu part creation screen 400 for setting, as menus, the group information into which the design parts are classified, detects each of the design parts classified into a group set in the menu part creation screen 400 from the storage unit 32, links the detected part to the corresponding group, and creates a new design part (menu part) for displaying the group as the menu. This allows the business operator to create a menu page that links to each design part by simply registering groups as menus.

Furthermore, the design part creation section 1010 creates a new design part (panel part) by combining the plurality of design parts selected from the storage unit 32 and arranged at desired positions respectively. As a result, by inserting different design parts between two common design parts in a so-called nesting state, for example, as shown in FIG. 13, two men's panel part 1300*a* and women's panel part 1300*b* having different menus can be easily created while the menu over banner 1310 and the menu under banner 1320 are displayed in common. In addition, the business operator can edit the two men's panel part 1300*a* and the women's panel part 1300*b* at once by editing the menu over banner 1310 and the menu under banner 1320 displayed in common.

The content management apparatus 3 further includes the device setting section (content setting section) 1030 for setting content to be displayed on a device for each type of devices and the content display section 1040 for displaying the content created by the content creation section 1020. In response to access from the consumer terminal 4-*j*, the content display section 1040 specifies the type of the device of the consumer terminal 4-*j* and displays, on the device, the content set according to the specified device type. As a result, the business operator can prepare the content for each device, or can prepare only one content commonly used for the devices.

Further, the content creation section 1020 creates a goods page which is content by combining the design parts (first optional parts) that describe the information of the preferential treatment for bronze members to be displayed when meeting the displaying condition (first condition), that is, the member stage of the consumer who instructed to display the goods page is "bronze member", and the design parts (second optional parts) that describe the information of the preferential treatment for silver members to be displayed when meeting the displaying condition (second condition), that is, "silver member". Then, when meeting the displaying condition (first condition), that is, the member stage of the consumer who instructed to display the goods page is "bronze member", the content display section 1040 displays the design parts on the goods page describing the information of the preferential treatment for bronze members "granting free shipping coupon". On the other hand, when meeting the displaying condition (second condition), that is, the member stage of the consumer who instructed to display the goods page is "silver member", the content display section 1040 displays the design parts on the goods page describing the information of the preferential treatment for silver members "granting free shipping coupon and granting 5% discount coupon in the month of birth". As described above, the business operator can realize the conditional branch in which the different information of the preferential treatment is displayed according to the member stage of the consumer by simple condition setting for arranging the design parts having different displaying conditions side by side.

The present invention is not limited to the above-described embodiment, and various modifications and applications are possible. Hereinafter, a modification of the above embodiment applicable to the present invention will be described.

In the above embodiment, the program executed by the CPU of the control unit 33 is stored in advance in the ROM or the like. However, the present invention is not limited thereto, and a program for executing the above-described processes may be applied to an existing general-purpose computer to function as the content management apparatus 3 according to the above-described embodiment.

The method of providing such a program is arbitrary. For example, the program may be stored in a computer-readable recording medium (a flexible disk, a CD (Compact Disc)-ROM, a DVD (Digital Versatile Disc)-ROM, or the like) to distribute it, or the program may be stored in a storage on a network such as the Internet and provided by downloading the program.

In addition, when the above processes are executed by the division of the OS and the application program or by the cooperation with the OS and the application program, only the application program may be stored in the recording medium or the storage. It is also possible to superimpose the program on a carrier wave and distribute the program via a network. For example, the program may be posted to a bulletin board (BBS: Bulletin Board System) on a network, and the program may be distributed over the network. Then, the program may be started and executed under the control of the OS in the same way as other application programs, so that the above processes can be executed.

It is to be noted that the present invention is intended to be capable of various embodiments and variations without departing from the broad spirit and scope of the present invention. In addition, the above-described embodiment is intended to illustrate one embodiment of the present invention and does not limit the scope of the present invention.

This application is based on Japanese Patent Application No. 2018-97478, filed May 21, 2018. The specification, claims and drawings of the Japanese Patent Application No. 2018-97478 are incorporated herein by reference in their entirety.

EXPLANATION OF REFERENCE NUMERAL

1: Content management system
2-$i$: Business operator terminal
3: Content management apparatus
4-$j$: Consumer terminal
21: Display unit
22: Operation unit
23: Communication unit
24: Control unit
31: Communication unit
32: Storage unit
33: Control unit
41: Touch panel
42: Communication unit
43: Control unit
300: Pattern part creation screen
310: Text box
320: Image box
330: Design part creation icon
400: Menu part creation screen
410: Menu
420: Menu part creation icon
500: Panel part creation screen
510: Design parts
520: Panel part creation icon
600: Theme list screen
610-$k$: theme
611-$k$: Layout setting icon
620: Device setting icon
700: Layout setting screen
710: System parts
711: Goods-name displaying section
712: Goods-price displaying section
713: Goods-image displaying section
714: Goods variation selection and adding to cart button
715: Goods-description displaying section
720: Design parts
721: Goods-supplementary-information displaying section
722: Goods-price-supplementary-information displaying section
723: Goods-order-supplementary-information displaying section
730: Content creation icon
800: Device setting screen
810: Smartphone setting tab
820: Tablet setting tab
830: PC setting tab
1010: Design part creation section
1020: Content creation section
1030: Device setting section
1040: Content display section
1100: Design part
1110: Heading
1120: Body of a message
1130: Image
1200$a$: Men's menu part
1200$b$: Women's menu part
1210$a$: Men's menu
1210$b$: Women's menu
1300$a$: Men's panel part
1300$b$: Women's panel part
1310: Menu over banner
1320: Menu under banner

What is claimed is:

1. A content management apparatus comprising:
a communication unit for receiving an operation signal and sending a management screen to a business operator terminal;
a storage unit for storing a plurality of parts constituting a part of content;
a content creation section for creating the content by combining the plurality of parts within a changed layout displayed in the management screen, the plurality of parts are selected from the storage unit according to the operation signal;
a second content display section for displaying the content created by the content creation section; and
a second optional part creation section which displays a menu setting screen for setting a group into which the optional part is classified as a menu, detects the optional part to be classified into the group set in the menu setting screen from the storage unit, links the detected optional part to the corresponding group, and creates a new optional part for displaying the group as the menu;
wherein the parts include essential parts which are essential for displaying the content and are restricted from being edited by a user, and at least one optional part which can be arbitrarily added and is created by the user;
wherein the content creation section creates the content by changing the arrangement order of the essential parts as well as arranging the optional part between the essential parts in the changed layout;
wherein the content creation section creates the content by combining a first optional part displayed when a first user information is met with a second optional part displayed when a second user information different from the first user information is met, and
wherein the second content display section displays the first optional part in the content when the first user information is met, while displays the second optional part in the content when the second user information is met.

2. The content management apparatus according to claim 1, wherein the content creation section rearranges the essential parts which are arranged at predetermined positions, and arranges the optional part between the essential parts to create the content.

3. The content management apparatus according to claim 1, further comprising a first optional part creation section for displaying an optional part creation screen corresponding to a format selected from among a plurality of types of formats prepared in advance, and creating the optional part corresponding to contents set in the optional part creation screen.

4. The content management apparatus according to claim 1, further comprising a third optional part creation section which creates a new optional part by combining a plurality of optional parts which are respectively arranged at desired positions and selected from the storage unit.

5. The content management apparatus according to claim 1 further comprising:
- a content setting section for setting the content to be displayed on a device according to each type of devices; and
- a first content display section for specifying the type of the device in response to access from the device and displaying the content set so as to correspond to the type of the specified device on the device.

6. A content management method with a content management apparatus comprising a communication unit and a storage unit for storing a plurality of parts constituting a part of content, the method comprising:
- a step of receiving an operation signal;
- a step of creating the content by combining the plurality of parts within a changed layout shown in the management screen, the plurality of parts are selected from the storage unit according to the operation signal;
- a step of sending a management screen in which the changed layout is displayed to a business operator terminal; and
- a step of setting a group into which the optional part is classified as a menu, detects the optional part to be classified into the group set in the menu setting screen from the storage unit, links the detected optional part to the corresponding group, and creates a new optional part for displaying the group as the menu;
- wherein the parts include essential parts which are essential for displaying the content and are restricted from being edited by a user, and at least one optional part which can be arbitrarily added and is created by the user; and
- wherein the content creation section creates the content by changing the arrangement order of the essential parts as well as arranging the optional part between the essential parts in the changed layout.

7. A program for causing a computer of a content management apparatus comprising a communication unit for receiving an operation signal and sending a management screen to a business operator terminal and a storage unit for storing a plurality of parts constituting a part of content to create the content by combining the plurality of parts within a changed layout displayed in the management screen, the plurality of parts are selected from the storage unit displays the content created; sets a group into which the optional part is classified as a menu, detects the optional part to be classified into the group set in the menu setting screen from the storage unit, links the detected optional part to the corresponding group, and creates a new optional part for displaying the group as the menu;
- wherein the parts include essential parts which are essential for displaying the content and are restricted from being edited by a user, and at least one optional part which can be arbitrarily added and is created by the user; and
- wherein the content creation section creates the content by changing the arrangement order of the essential parts as well as arranging the optional part between the essential parts in the changed layout.

* * * * *